(12) United States Patent
Maiorana et al.

(10) Patent No.: US 7,832,767 B2
(45) Date of Patent: Nov. 16, 2010

(54) ALUMINUM FLATBED WITH UNIQUE FRONT CONNECTION

(75) Inventors: James A. Maiorana, Hartville, OH (US); Denis Gosselin, Saint-Georges (CA)

(73) Assignee: MAC Trailer Manufacturing, Inc., Alliance, OH (US)

( * ) Notice: Subject to any disclaimer, the term of this patent is extended or adjusted under 35 U.S.C. 154(b) by 369 days.

(21) Appl. No.: 12/006,649

(22) Filed: Jan. 4, 2008

(65) Prior Publication Data

US 2009/0174171 A1    Jul. 9, 2009

(51) Int. Cl.
*B62D 53/06* (2006.01)

(52) U.S. Cl. ............. 280/789; 280/425.1; 280/425.2; 280/441.2; 280/781; 280/785; 280/423.1; 228/168; 228/169; 29/525.01; 29/525.14; 29/897.2

(58) Field of Classification Search ......... 280/781, 280/785, 789, 423.1, 425.1, 425.2, 438.1, 280/441.2; 180/311; 228/164, 165, 168, 228/169, 174; 29/525.01, 525.14, 897.2
See application file for complete search history.

(56) References Cited

U.S. PATENT DOCUMENTS

| | | | | |
|---|---|---|---|---|
| 1,708,753 A | * | 4/1929 | Dalton | 280/781 |
| 2,223,650 A | * | 12/1940 | Weber | 280/504 |
| 2,277,615 A | * | 3/1942 | Townsend | 29/897.35 |
| 2,717,707 A | * | 9/1955 | Martin | 414/475 |
| 2,812,088 A | * | 11/1957 | Cadillac et al. | 414/478 |
| 2,894,764 A | * | 7/1959 | Ronk | 280/425.2 |
| 3,874,703 A | * | 4/1975 | Ross et al. | 280/425.1 |
| 3,894,749 A | * | 7/1975 | Kozuh | 280/638 |
| 3,926,530 A | * | 12/1975 | Deller | 403/167 |
| 3,986,727 A | * | 10/1976 | Cox | 280/417.1 |
| 4,261,594 A | * | 4/1981 | Corbett et al. | 280/495 |
| 4,290,642 A | * | 9/1981 | Wise | 296/25 |
| 4,358,134 A | * | 11/1982 | Scully | 280/676 |
| 4,634,168 A | * | 1/1987 | Fuchs et al. | 296/35.1 |
| 4,635,997 A | * | 1/1987 | Holt et al. | 296/184.1 |
| 5,210,921 A | * | 5/1993 | Booher | 29/401.1 |
| 5,324,061 A | * | 6/1994 | Lay | 280/417.1 |
| 6,874,803 B2 | * | 4/2005 | McDougall et al. | 280/441.2 |
| 7,377,536 B2 | * | 5/2008 | Rehme | 280/483 |
| 7,441,809 B1 | * | 10/2008 | Coombs et al. | 280/785 |
| 2005/0253361 A1 | * | 11/2005 | Bouwkamp | 280/441.2 |
| 2008/0012390 A1 | * | 1/2008 | Streubel | 296/203.01 |

* cited by examiner

*Primary Examiner*—Ruth Ilan
*Assistant Examiner*—James English
(74) *Attorney, Agent, or Firm*—Sand & Sebolt

(57) ABSTRACT

A drop deck trailer frame includes a front section having a first upper surface, a rear section having a second upper surface lower than the first upper surface, and an improved connection between the front and rear sections which tends to reduce cracking which commonly occurs in drop deck trailer frames due to the stresses in the region of the connection. The connection preferably includes a semicircular weld. In addition, heat treated bent flanges are typically used to provide additional strength. Fasteners such as bolts are also typically used to connect various flanges.

37 Claims, 4 Drawing Sheets

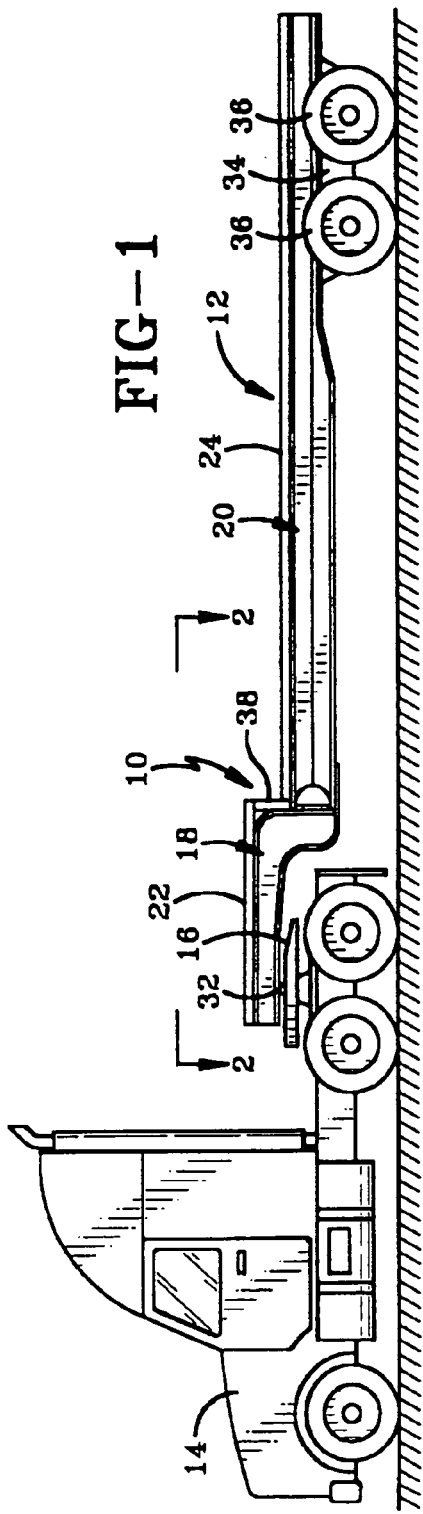
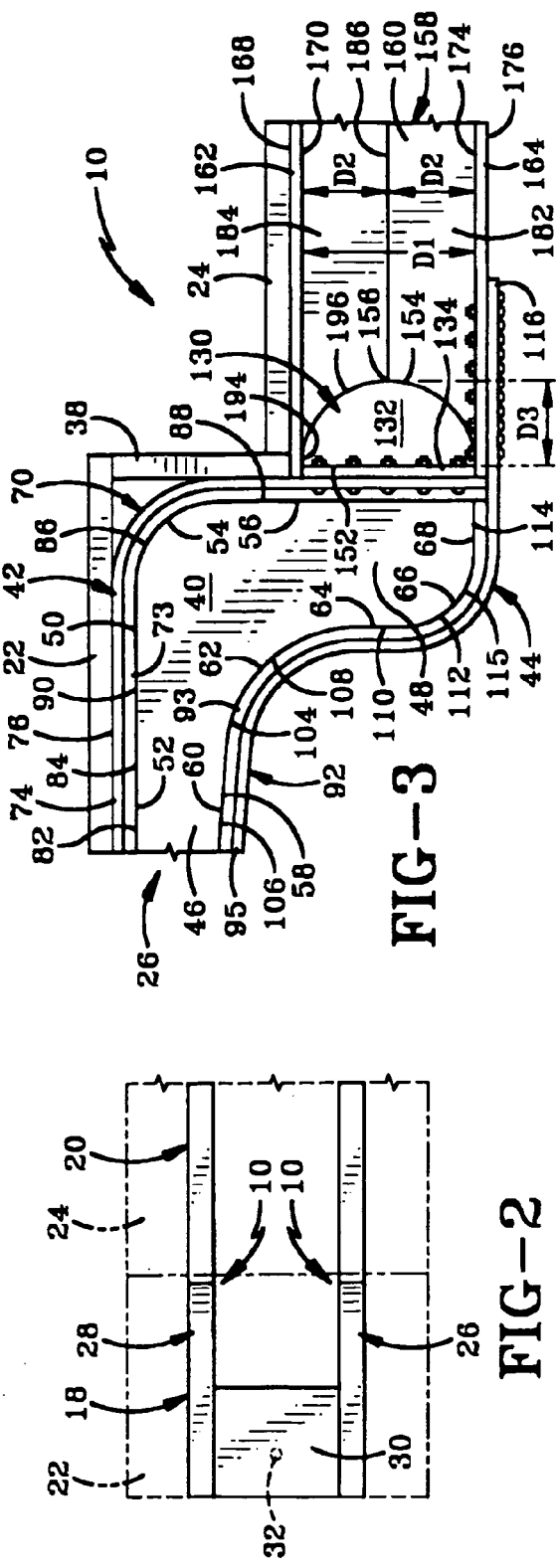

2

ALUMINUM FLATBED WITH UNIQUE FRONT CONNECTION

BACKGROUND OF THE INVENTION

1. Technical Field

The present invention relates generally to flatbed trailers. More particularly, the present invention relates to a drop deck trailer. Specifically, the invention relates to the front connection between the upper and lower decks of the drop deck trailer.

2. Background Information

Drop deck trailers are well known in the art and include an upper deck at the front of the trailer and a lower deck which is connected to and extends rearwardly from the upper deck. This configuration allows for the upper to be connected to an elevated hitch such as a fifth wheel while the lower deck may be position at a lower height to provide for additional storage within the height perimeters required by various regulations for roadways and highways.

One problem which is commonly seen in drop deck trailers is the formation of cracks or other deterioration within the structure connecting the upper and lower decks of the trailer frame due to the inherent forces acting along this region of the frame especially when the trailer is fully loaded. The present invention addresses this and other problems in the art.

BRIEF SUMMARY OF THE INVENTION

The present invention provides a drop deck trailer frame comprising: a front section having a first upper surface; a rear section having a second upper surface lower than the first upper surface; a connection between the front and rear sections; and a semicircular weld on the connection.

The present invention also provides a drop deck trailer frame comprising: a front section having a first upper surface; a rear section having a second upper surface lower than the first upper surface; a heat treated bent flange on one of the front and rear sections secured to the other of the front and rear sections.

The present invention further provides a drop deck trailer frame comprising: a front section having a first upper surface; a rear section having a second upper surface lower than the first upper surface; an S-shaped flange on one of the front and rear sections secured to the other of the front and rear sections.

BRIEF DESCRIPTION OF THE SEVERAL VIEWS OF THE DRAWINGS

FIG. 1 is a side elevational view of the drop deck trailer of the present invention hitched to a tractor via a fifth wheel.

FIG. 2 is a top plan view taken on line 2-2 of FIG. 1 shown the front connection region of the trailer with the upper and lower decks shown in phantom.

FIG. 3 is a side elevational view of the front connection.

DETAILED DESCRIPTION OF THE INVENTION

Figure 5:
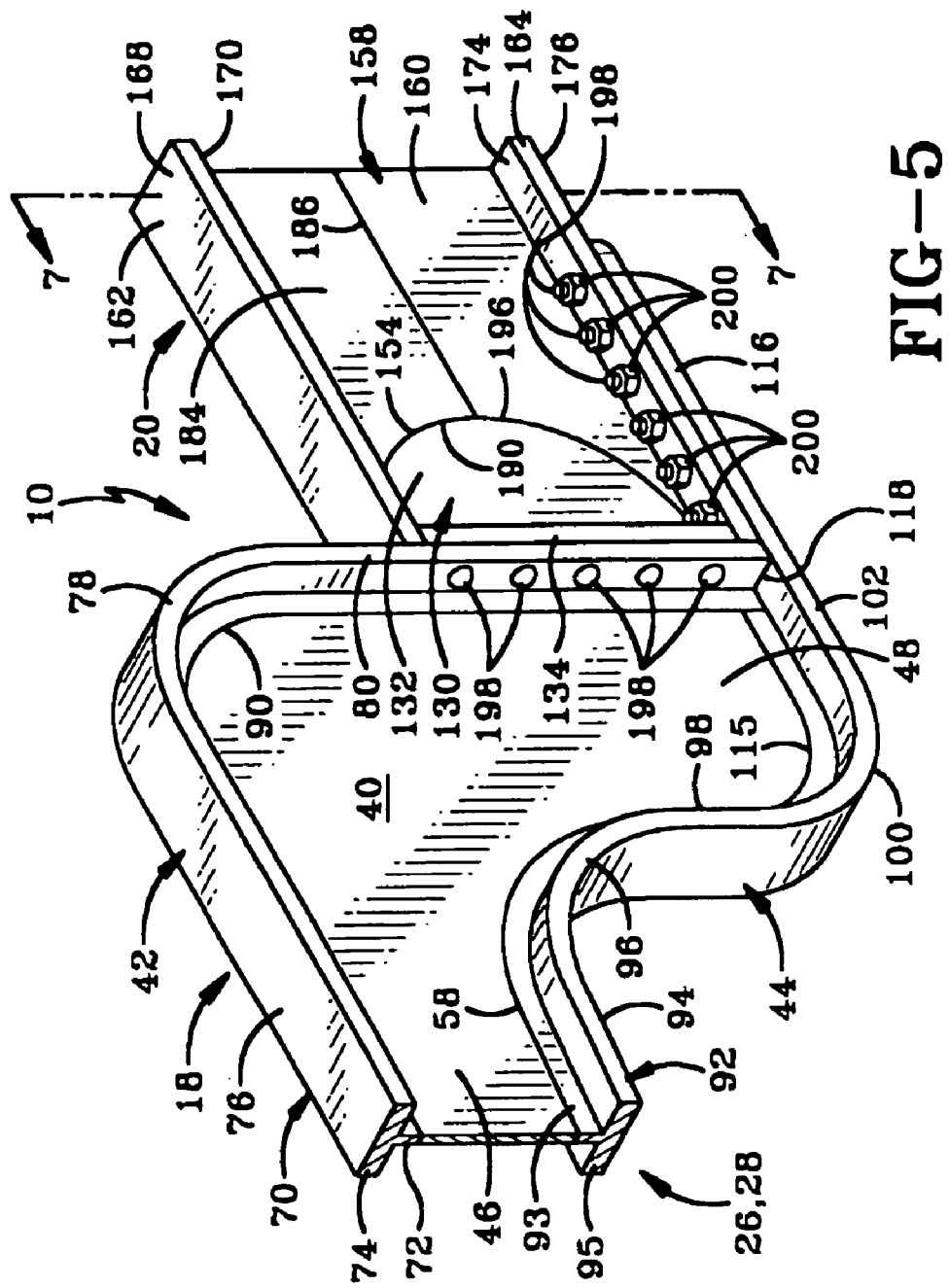
FIG. 5 is a perspective view of the front connection when assembled.

The front connection of the present invention as shown generally at 10 in FIGS. 3 and 5. FIG. 1 shows front connection 10 as part of a drop deck trailer 12 which is hitched to a towing vehicle in the form of a tractor 14 via a fifth wheel hitch 16. Trailer 12 includes front and rear sections 18 and 20 which respectively include upper and lower decks 22 and 24. A vertical decking member 38 (FIGS. 1, 3) is connected to and extends between the rear end of upper deck 22 and the front end of lower deck 24 to define the boundary therebetween. Member 38 and decks 22 and 24 may be formed of metal, wood or other suitable materials. As shown in FIG. 2, trailer 12 includes a frame comprising first and second longitudinally extending parallel rails 26 and 28 connected adjacent the front ends by a cross member 30 which extends axially therebetween and serves as a hitch support on which a hitch member 32 is mounted for connection to fifth wheel 16. Adjacent the rear ends of rails 26 and 28, a wheel mounting structure 34 is connected to and extends axially between rails 26 and 28 to support wheels 36, as shown in FIG. 1. Rails 26 and 28 are substantially identical or are mirror images of one another and thus each include a front connection 10. Each of rails 26 and 28 is formed of metal and typically the primary components are formed of an aluminum alloy. The use of an aluminum alloy provides for a relatively low cost and light weight structure for supporting decks 22 and 24 and loads carried thereon.

Figure 4:
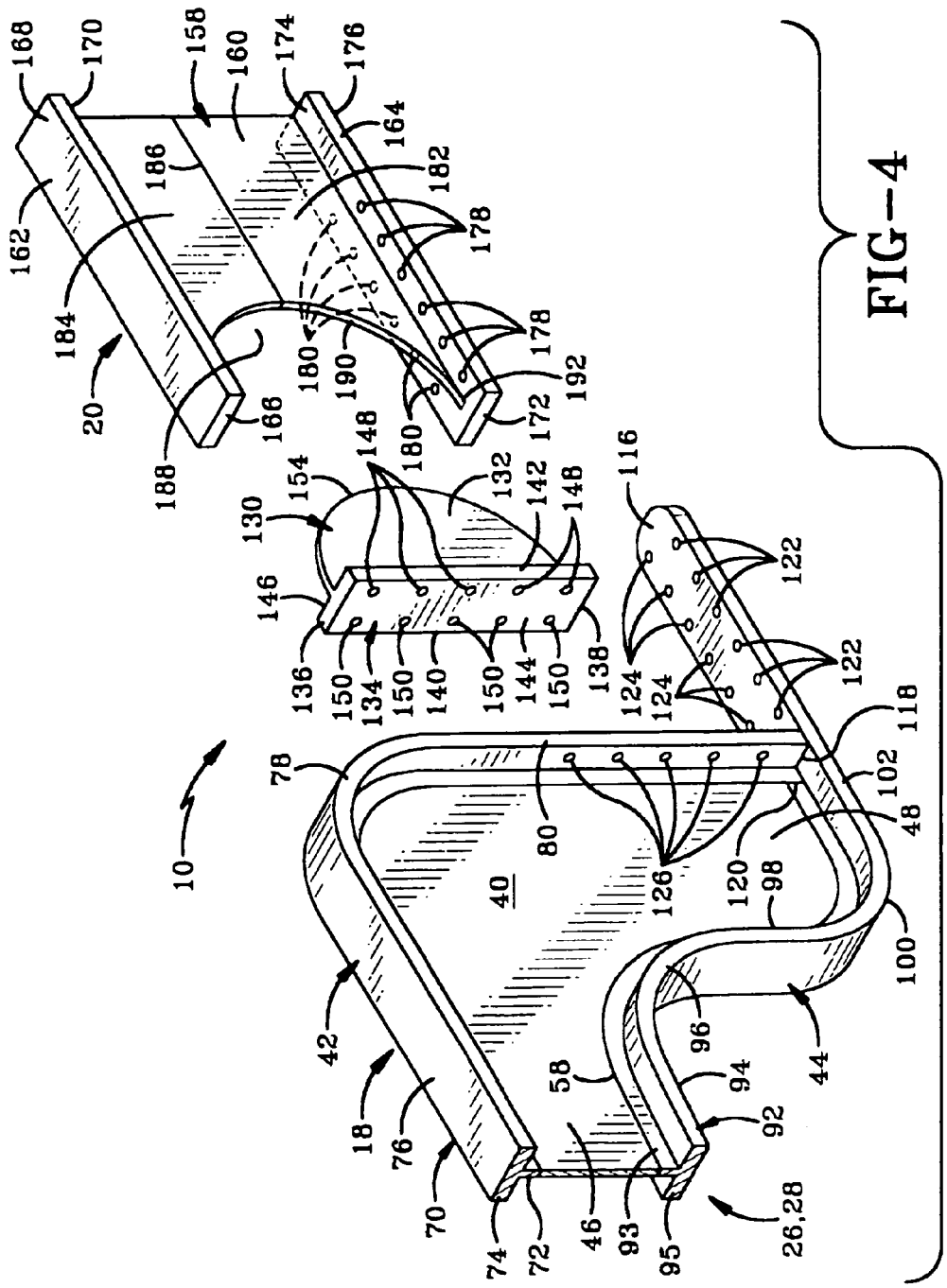
FIG. 4 is an exploded perspective view of the front connection.

Referring to FIGS. 3-5, connection 10 is described in greater detail. Rail 26 includes an L-shaped structure comprising an L-shaped plate 40, an L-shaped flange 42 connected to plate 40 and an S-shaped flange 44 connected to plate 40. Plate 40 is substantially flat and substantially vertically oriented along a vertical longitudinally extending plane. Plate 40 includes a generally horizontal first leg 46 which extends laterally in the longitudinal direction and a generally vertical second leg 48 which is connected to the rear end of first leg 46 and extends downwardly therefrom. Plate 40 has an L-shaped edge 50 including a generally horizontal edge segment 52 which extends laterally in a longitudinal direction and faces upwardly. Edge 50 further includes a convex arcuate edge segment 54 which is connected to the rear end of segment 52, faces upwardly and rearwardly, and curves downwardly to a downwardly extending generally vertical edge segment 56. Opposite L-shaped edge 50, plate 40 has an S-shaped edge 58 which includes a downwardly facing generally horizontal edge segment 60 which extends laterally in the longitudinal direction. A concave arcuate edge segment 62 curves downwardly from the rear of segment 60 and faces forward and downward. A short vertical edge segment 64 extends downwardly from arcuate segment 62 and serves as a brief transition to another arcuate segment 66 which is convex and curves in the opposite direction from segment 62 and thus downwardly and rearwardly. Vertical segment 64 faces forward while arcuate segment 66 faces forward and downward. A generally horizontal edge segment 68 extends rearwardly from arcuate segment 66 and faces downwardly. Segment 68 intersects edge segment 56 of L-shaped edge 50 at the lower rear corner of plate 40 and is substantially perpendicular to segment 56.

With continued reference to FIGS. 3-5, an L-shaped T-bar 70 extends along and is connected to the mating L-shaped edge 50 of plate 40. As best shown in FIGS. 4 and 5, T-bar 70 includes an L-shaped web 72 which serves as the upright of the T-shaped cross section and an L-shaped crossbar 74 which serves as the top of the T-shaped cross section and extends outwardly from web 72 in opposite directions. Crossbar 74 serves as L-shaped flange 42 in the exemplary embodiment. Crossbar 74 includes a generally horizontal segment 76 and arcuate segment 78 curving downward therefrom and a generally vertical segment 80 extending downwardly from arcuate segment 78 so that segments 76, 78 and 80 extend in an analogous manner respectively to edge segments 52, 54 and 56 of the L-shaped edge 50. Thus, web 72 has an L-shaped edge 82 which mates with L-shaped edge 50 of plate 40. Edge 82 thus includes a generally horizontal segment 84, a concave arcuate segment 86 and a vertical segment 88 which respectively mate with edge segments 52, 54 and 56 of L-shaped edge 50 of plate 40. Horizontal segment 84 faces downwardly, arcuate segment 86 faces downwardly and forward and vertical segment 88 faces forward. L-shaped edge 82 is connected to L-shaped edge 50 via an L-shaped continuous weld 90 which thus has analogous horizontal, arcuate and vertical segments. Segment 76 has a substantially horizontal upper surface which serves as the upper surface of front section 18 of the frame upon which upper deck 22 is seated and secured.

An S-shaped T-bar 92 extends along and has a mating configuration with S-shaped edge 58 and is connected to plate 40 along edge 58. T-bar 92 has an S-shaped web 93 and an S-shaped crossbar 95 connected to and extending outwardly in opposite directions from web 93. Crossbar 95 thus forms an S-shaped flange 44 in the exemplary embodiment. T-bar 92 includes a generally horizontal segment 94, an arcuate segment 96 curving downwardly and rearwardly therefrom, a short vertical segment 98 at the bottom of arcuate segment 96, an arcuate segment 100 curving downwardly and rearwardly from vertical segment 98 in the opposite direction of segment 96, and a generally horizontal segment 102 extending rearwardly from arcuate segment 100. Web 93 thus includes an S-shaped edge 104 including a generally horizontal longitudinally extending edge segment 106, a convex arcuate edge segment 108 curving downwardly and rearwardly therefrom, a short vertical edge segment 110 extending down from segment 108, a concave arcuate edge segment 112 curving downwardly and rearwardly from segment 110, and a generally horizontal edge segment 114 extending rearwardly from arcuate segment 112. Edge segment 106 faces upwardly, arcuate edge segment 108 faces upwardly and rearwardly, vertical edge segment 110 faces rearwardly, arcuate edge segment 112 faces upwardly and rearwardly, and horizontal segment 114 faces upwardly. Thus, edge segments 106, 108, 110, 112 and 114 respectively matingly fit with segments 60, 62, 64, 66, and 68 of S-shaped edge 58 of plate 40. S-shaped edges 58 and 104 are welded to one another via a continuous S-shaped weld 115.

Figure 6:
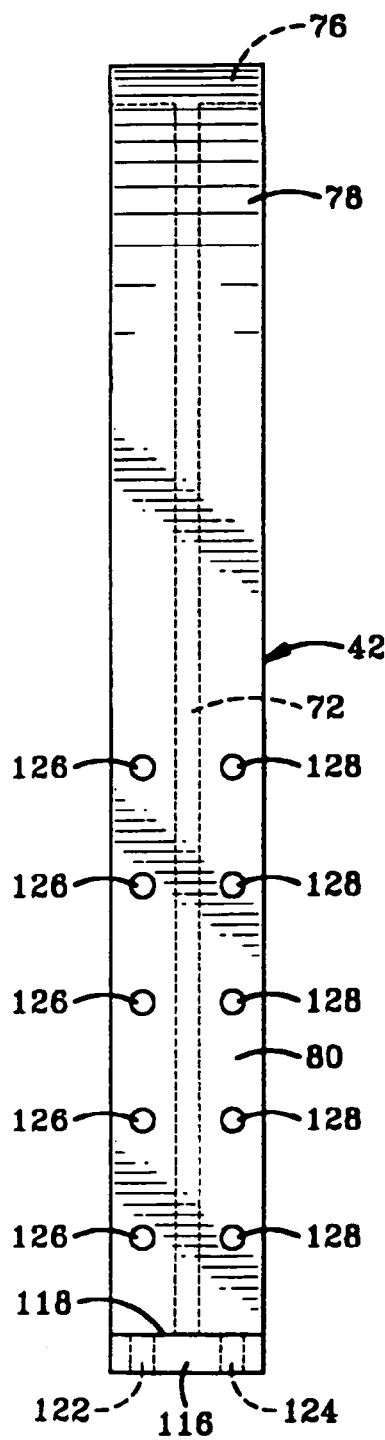
FIG. 6 is an end elevational view looking forward on the L-shaped structure of the connection.
Figure 7:
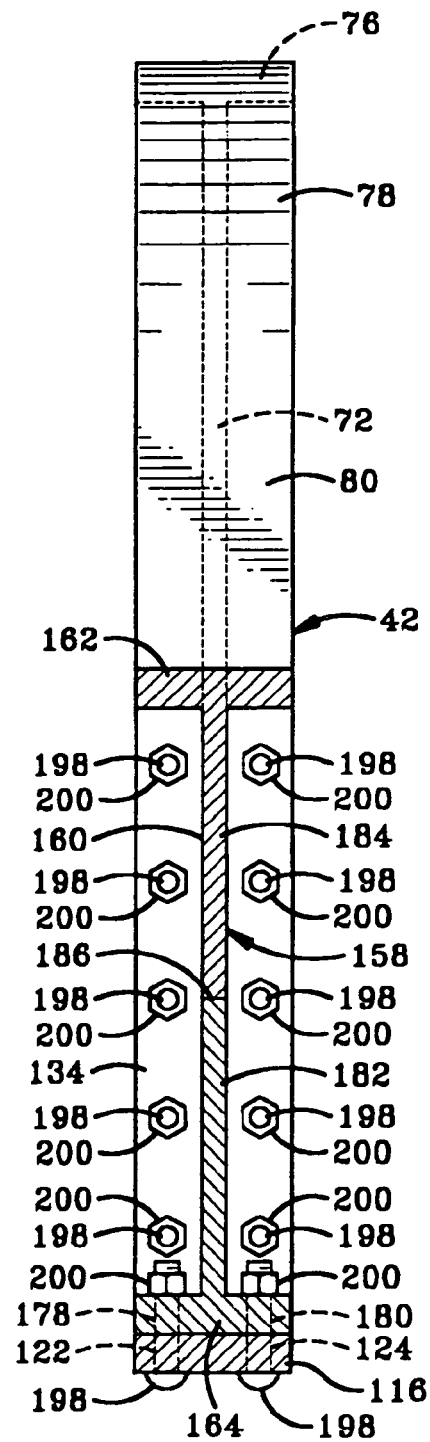
FIG. 7 is a sectional view taken on line 7-7 of FIG. 5.

A flat and generally horizontal tongue 116 extends rearwardly from a lower end 118 of vertical segment 80 of L-shaped T-bar 70 and is formed from a portion of crossbar 95 from which web 93 has been removed. More particularly, web 93 has a rearmost terminal end 120 which abuts web 72 of L-shaped T-bar 70 adjacent lower end 118 thereof. Web 93 has been removed rearwardly of terminal end 120 so that only crossbar 95 continues to project rearwardly in the form of tongue 116. Lower end 118 of segment 80 abuts the upper surface of segment 102 at the front of tongue 116, and thus L-shaped flange 42 at its lowest and rearmost portion intersects S-shaped flange 44 along horizontal segment 102 to form an inverted T-shaped intersection. A first row of longitudinally spaced through holes 122 is formed in tongue 116 generally along one side thereof. Likewise, a second row of longitudinally spaced through holes 124 formed in tongue 116 along the opposite side thereof so that the row of holes 124 is axially spaced from the row of holes 122 and holes 124 are also longitudinally offset from holes 122. Holes 122 and 124 extend from the top surface of tongue of 116 to the bottom surface thereof. Another row of vertically spaced through holes 126 (FIGS. 4, 6) is formed in vertical segment 80 of crossbar 74 extending from the front to the rear surface thereof and positioned on the one side of web 72 and plate 40. Likewise, another row of vertically spaced through holes 128 (FIG. 6) is formed in vertical segment 80 of crossbar 74 on the other side of web 72 and plate 40.

In the exemplary embodiment, each of T-bars 70 and 92 is formed in an extrusion process. The extruded T-bars are bent to form their respective arcuate segments and L-shaped and S-shaped configurations typically at room temperature. A portion of web 93 is cut off or otherwise removed from the corresponding section of crossbar 95 to form tongue 116 as previously noted. Once the extruded T-bars are in their appropriate L-shaped and S-shaped configurations, they are heat treated in order to provide additional strength and eliminate internal stresses caused by the bending process. The heat treated T-bars are subsequently welded to the L-shaped and S-shaped edges 50 and 58 of plate 40 at welds 90 and 115 to form the rigid L-shaped structure of front section 18.

Referring to FIG. 4, rail 26 further includes a rigid connection member 130 used in forming front connection 10. Connection member 130 is formed from a T-bar and includes a semicircular flat plate or web 132 and a straight vertically extending crossbar 134 connected to and extending perpendicularly outwardly in opposite axial directions from web 132. Web 132 lies in a substantially vertical longitudinally extending plane parallel to L-shaped plate 40 and is typically coplanar therewith. Crossbar 134 has upper and lower generally horizontal ends 136 and 138, first and second vertically extending lateral edges 140 and 142 and vertically extending front and rear surfaces 144 and 146. A first row of vertically spaced through holes 148 is formed in crossbar 134 on one side of web 132 extending from front surface 144 to rear surface 146 and respectively alignable with holes 126 in vertical segment 80. Likewise, a second row of holes 150 is formed in crossbar 134 on the other side of web 130 and respectively alignable with holes 128 (FIG. 6) in vertical segment 80. Web 130 has a straight vertically extending base 152 (FIG. 3) which is connected to rear surface 146 of crossbar 134 and extends from upper end 136 to lower end of 138. Web 130 extends rearwardly from base 152 and terminates at a semicircular edge 154 which curves rearwardly and downwardly from upper end 136 to a rearmost point 156 and then downwardly and forward to lower end 138.

With reference to FIGS. 3-5, rail 26 includes a generally horizontal beam 158 in the form of an I-beam which is connected to the L-shaped structure and connection member 130 and extends rearwardly therefrom. I-beam 58 includes a flat vertical plate or web 160, an upper flange 162 connected to and extending outwardly in opposite directions from the top of web 160, and a lower flange 164 connected to the bottom of web 160 and extending outwardly in opposite directions therefrom. Web 160 lies in a substantially vertical longitudinally extending plane parallel to plate 40 and web 132 and is typically coplanar therewith. Upper flange 162 has a front end 166, an upper surface 168 and a lower surface 170 from which web 160 extends downwardly. Upper surface 168 is substantially horizontal and serves as the upper surface of rear section 20 of the frame on which rear lower deck 24 is seated and secured. Lower flange 164 has a front end 172, an upper surface 174 from which web 160 extends upwardly, and a lower surface 176. A first row of through holes 178 is formed in lower flange 164 adjacent front end 172 thereof and extends from upper surface 174 to lower surface 176 on one side of web 160. A second row of longitudinally spaced holes 180 is likewise formed in lower flange 164 on the other side of web 160. Holes 178 are respectively alignable with holes 122 while holes 180 are respectively alignable with holes 124.

In the exemplary embodiment, I-beam 158 includes an inverted T-bar including lower flange 164 and a lower half 182 of web 160. I-beam 158 further includes another T-bar which includes upper flange 162 and an upper half 184 of web 160. Lower and upper halves 182 and 184 are connected to one another along a substantially horizontal longitudinally elongated weld 186. A front semicircular opening 188 is formed at the front of web 160 and extends rearwardly therefrom and is bounded by a semicircular concavely curving front edge 190 having a lower front end 192 spaced a short distance rearwardly from front end 172 of crossbar 164 and an upper front end 194 (FIG. 3) which is likewise spaced rearwardly a short distance from front end 166 of upper flange 162. Weld 186 intersects front edge 190 at its midpoint so that a quarter circle of edge 190 is form in lower half 182 and a quarter circle is formed in upper half 184. In the exemplary embodiment, web 160 has a height D1 (FIG. 3) defined between lower surface 170 of upper flange 162 and upper surface 174 of lower flange 164. Weld 186 is at the midway point between surfaces 170 and 174 so that lower half 182 and upper half 184 of plate 160 each have a height D2 which is one half of height D1. In the exemplary embodiment, point 156 of web 132 and rear surface of 152 of crossbar 134 define therebetween a normal distance D3 which is equal to distance D1. Thus, connection member 130 may be formed of a T-bar having the same cross sectional configuration as that of the T-bars which are used to form I-beam 158.

When the various components are assembled as shown in FIGS. 3 and 5, web 132 of connection member 130 is received within semicircular opening 188 and crossbar 134 is received between upper and lower crossbars 162 and 164 adjacent their respective front ends 166 and 172 and respectively forward of front ends 194 and 192 of edge 190. Thus, upper and lower ends 136 and 138 of crossbar 134 define a distance which is nearly the same as distance D1 although typically slightly less so that crossbar 134 can easily be received in between and welded to flanges 162 and 164. The convexly curving semicircular edge 154 of web 132 is of a mating configuration with concave semicircular edge 190 of web 160. Edge 154 and edge 190 lie along a circular path having substantially the same diameter although the diameter along which edge 154 lies may be slightly less to easily accommodate web 132 within opening 188. Once connection member 130 is positioned within space 188, edge 154 is welded to edge 190 along a semicircular weld 196 while upper and lower ends 136 and 138 of crossbar 132 are welded respectively to lower surface 170 of upper crossbar 162 and upper surface 174 of crossbar 164. Fasteners in the form of bolts 198 and nuts 200 are typically used to form part of front connection 10. More particularly, bolts 198 are received through aligned holes 126 and 148 and threadedly engaged by respective nuts 200. Likewise, bolts 198 extend through aligned holes 128 and 150. Bolts 198 also extend through aligned holes 122 and 178 as well as through aligned holes 124 and 180.

When assembled, flange 134 of connection member 130 and vertical segment 80 of flange 42 are secured to one another by the respective bolts and nuts to form a vertical parallel pair of abutting flanges. Likewise, tongue 116 and the front portion of lower flange 164 of I-beam 158 are secured by respective bolts and nuts to form a second pair of parallel abutting flanges which extend transversely to and most typically perpendicularly to flanges 134 and 80. Semicircular weld 196 extends within the right angle formed between these two pairs of parallel flanges with its lower quarter circle portion disposed directly between the two pairs of flanges.

Thus, front connection 10 provides a substantially improved connection between the front and rear sections 18 and 20 of the frame of drop deck trailer 12. The semicircular weld 196 helps to reduce cracking in the connection by minimizing stress points found in linear welds. In addition, the L-shaped and S-shaped structures of flanges 42 and 44 help provide structural integrity to the connection. The heat treatment of the T-bars forming flanges 42 and 44 likewise provide additional strength and reduce or eliminate built in stresses which would otherwise remain from the bending of these two bars. The L-shaped and S-shaped welds along flanges 42 and 44 provide further structural integrity to the connection. The use of tongue 116 which is formed integrally during extrusion with the lower T-bar forming flange 44 provides additional strength to the connection between S-shaped flange 44 and I-beam 158. These and other aspects of front connection 10 provide a substantially improved connection.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A drop deck trailer frame comprising:
a front section having a first upper surface;
a rear section having a second upper surface lower than the first upper surface;
a connection between the front and rear sections; and
a semicircular weld on the connection;
wherein the semicircular weld lies along a substantially vertical longitudinally extending plane.

2. The frame of claim 1 further comprising:
a heat treated bent flange on one of the front and rear sections secured to the other of the front and rear sections.

3. The frame of claim 1 further comprising:
an S-shaped flange on one of the front and rear sections secured to the other of the front and rear sections.

4. The frame of claim 3 further comprising:
an L-shaped flange on the one of the front and rear sections secured to the other of the front and rear sections.

5. The frame of claim 4 further comprising:
an L-shaped plate extending between and connected to the S-shaped and L-shaped flanges.

6. The frame of claim 1 further comprising:
a plurality of fasteners extending from the front section to the rear section to join the two sections.

7. The frame of claim 1 further comprising:
a first plate; and
a semicircular edge on the first plate; and
wherein the weld is formed along the semicircular edge.

8. The frame of claim 7 further comprising:
a second plate; and
wherein the weld joins the first and second plates.

9. The frame of claim 7 further comprising:
a second plate substantially parallel to the first plate;
a first flange connected to one of the first and second plates; and
a second flange extending parallel to and abutting the first flange and secured thereto.

10. The frame of claim 7 further comprising:
a first flange connected to the first plate and having first and second opposed ends; and
wherein the first plate is semicircular; and the semicircular edge is a convex semicircular edge extending from adjacent the first end of the first flange to adjacent the second end of the first flange.

11. The frame of claim 7 further comprising:
a first flange connected to the first plate; and
a second flange extending parallel to and abutting the first flange and secured thereto.

12. The frame of claim 11 further comprising:
a plurality of fasteners extending from the second flange to the first flange to secure the second flange to the first flange.

13. The frame of claim 11 further comprising:
third and fourth flanges extending transversely to and adjacent the first and second flanges.

14. The frame of claim 13 further comprising:
a second plate extending between and connected to the third and fourth flanges and connected to the first plate via the weld.

15. The frame of claim 14 further comprising:
a fifth flange extending parallel to the fourth flange and secured thereto.

16. The frame of claim 15 further comprising:
a third plate extending between and connected to the second and fifth flanges.

17. The frame of claim 1 further comprising:
a first pair of parallel flanges which abut and are secured to one another to provide part of the connection; and,
a second pair of parallel flanges which extend transversely to the first pair of flanges and which abut and are secured to one another to provide part of the connection.

18. The frame of claim 17 further comprising:
a plurality of fasteners securing the first pair of flanges to one another; and
a plurality of fasteners securing the second pair of flanges to one another.

19. The frame of claim 17 wherein the semicircular weld extends between the first and second pairs of flanges.

20. The frame of claim 1 wherein the semicircular weld has upper and lower ends and a rearmost point; the semicircular weld curves rearwardly and downwardly from the upper end to the rearmost point and curves rearwardly and upwardly from the upper end to the rearmost point.

21. The frame of claim 1 further comprising
first and second parallel vertical plates; a first vertical flange secured to the first vertical plate; and
a first horizontal flange secured to the second vertical plate;
an end of one of the flanges adjacent the other of the flanges; and
a portion of the semicircular weld directly between the first vertical flanges and first horizontal flange.

22. The frame of claim 21 further comprising
a second horizontal flange secured to the second vertical plate so that the first and second horizontal flanges are aligned one above the other;
a second vertical flange which is secured to the first vertical plate, which extends from adjacent the first horizontal flange to adjacent the second horizontal flange and which is secured to the first vertical flange; and
wherein the semicircular weld in its entirety is directly between the first and second horizontal flanges.

23. A drop deck trailer frame comprising:
a front section having a first upper surface;
a rear section having a second upper surface lower than the first upper surface;
a heat treated bent flange on one of the front and rear sections secured to the other of the front and rear sections;

a connection between the front and rear sections; and
a semicircular weld on the connection.

24. The frame of claim 23 further comprising
a plurality of bolts; and
wherein the heat treated bent flange is secured to the other of the front and rear sections by the bolts.

25. The frame of claim 24 wherein the bent flange is a first flange; and further comprising
a second flange on the other of the front and rear sections;
wherein the bolts extend from the bent flange to the second flange to secured the bent flange to the second flange.

26. The frame of claim 23 further comprising
a horizontal flange on the other of the front and rear sections; and
wherein the horizontal flange has a horizontal surface; and the bent flange has an end which abuts the horizontal surface.

27. The frame of claim 23 further comprising
a vertical flange on the other of the front and rear sections; and
wherein the bent flange comprises a vertical segment which abuts and is secured to the vertical flange.

28. The frame of claim 27 further comprising
first and second parallel vertical webs;
wherein the first web is secured to the vertical segment of the bent flange and extends therefrom in a first direction; and
the second web is secured to the vertical flange and extends therefrom in a first direction opposite the second direction.

29. The frame of claim 23 wherein the bent flange comprises a vertical segment; and further comprising
a beam on the other of the front and rear sections comprising a vertical web with upper and lower horizontal flanges which are secured to the web and have respective ends adjacent the vertical segment.

30. A drop deck trailer frame comprising:
a front section having a first upper surface;
a rear section having a second upper surface lower than the first upper surface;
a plurality of bolts;
an S-shaped flange on one of the front and rear sections secured to the other of the front and rear sections by the bolts;
a connection between the front and rear sections; and
a semicircular weld on the connection.

31. The frame of claim 30 wherein the S-shaped flange is a first flange; and further comprising
a second flange on the other of the front and rear sections;
wherein the bolts extend from the S-shaped flange to the second flange to secured the S-shaped flange to the second flange.

32. The frame of claim 30 further comprising
a substantially vertical plate having an S-shaped edge secured to the S-shaped flange; and
a generally vertical flange which is secured to the plate and intersects the S-shaped flange to form a T-shaped intersection.

33. The frame of claim 30 further comprising
a substantially vertical L-shaped plate on one of the front and rear sections;
an L-shaped flange which is secured to the L-shaped plate; and
wherein the S-shaped flange is secured to the L-shaped plate; and
the L-shaped flange intersects the S-shaped flange to form a T-shaped intersection.

34. The frame of claim 30 further comprising
a substantially vertical L-shaped plate on the one of the front and rear sections;
an L-shaped flange on the one of the front and rear sections; and
wherein the L-shaped plate has an L-shaped edge and an S-shaped edge;
the L-shaped edge has a generally horizontal edge segment and a generally vertical edge segment;
the L-shaped flange is secured to the L-shaped edge along the generally horizontal edge segment and generally vertical edge segment;
the S-shaped edge has a generally horizontal edge segment;
the S-shaped flange is secured to the S-shaped edge; and
the generally vertical edge segment of the L-shaped edge intersects the generally horizontal edge segment of the S-shaped edge.

35. The frame of claim 30 further comprising
a beam on the other of the front and rear sections;
wherein the beam comprises a vertical web and a horizontal flange secured to the web; and
the S-shaped flange comprises a horizontal segment which overlaps and is secured to the horizontal flange with one of the horizontal segment and horizontal flange seated atop the other of the horizontal segment and horizontal flange.

36. The frame of claim 30 further comprising
a first vertical plate on one of the front and rear sections;
a first vertical flange segment which is secured to the first vertical plate and has a terminal edge adjacent or abutting the S-shaped flange.

37. The frame of claim 30 further comprising
a first vertical plate on one of the front and rear sections;
a top and a bottom on the first vertical plate;
an upper flange secured to the top of the first plate and having a first end;
a lower flange secured to the bottom of the first plate and having a first end below the first end of the upper flange; and
a vertical flange extending from adjacent the first end of the upper flange to adjacent the first end of the lower flange.

* * * * *